United States Patent
Hsieh

(10) Patent No.: US 8,253,078 B2
(45) Date of Patent: Aug. 28, 2012

(54) TEMPERATURE CONTROL CIRCUIT

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 318 days.

(21) Appl. No.: 12/755,400

(22) Filed: Apr. 6, 2010

(65) Prior Publication Data
US 2011/0155717 A1  Jun. 30, 2011

(30) Foreign Application Priority Data
Dec. 28, 2009 (CN) .......................... 2009 1 0312455

(51) Int. Cl.
*H05B 1/02* (2006.01)

(52) U.S. Cl. ...................................................... 219/494

(58) Field of Classification Search .................. 219/494
See application file for complete search history.

(56) References Cited

U.S. PATENT DOCUMENTS
2001/0054608 A1* 12/2001 Ohkuma et al. .............. 219/205
2007/0098043 A1* 5/2007 Wang ............................ 374/208
* cited by examiner

*Primary Examiner* — Hoai V Ho
(74) *Attorney, Agent, or Firm* — Altis Law Group, Inc.

(57) ABSTRACT

A temperature control circuit includes a microprocessor, a protection module, a first temperature detecting module, a second temperature detecting module, and a heating module. The first temperature detecting module includes a first thermistor and a first comparator connected to the first thermistor. The first thermistor is operable to sense a temperature to make the first comparator output a first signal to the microprocessor and the protection module. The protection module is operable to control the microprocessor to work or reset according to the first signal. The second temperature detecting module includes a second thermistor and a second comparator connected to the second thermistor. The second thermistor is operable to sense a temperature to make the second comparator output a second signal to the microprocessor. The heating module includes a heater. The microprocessor controls the heater to work or not to work according to the first and second signals.

20 Claims, 2 Drawing Sheets

TEMPERATURE CONTROL CIRCUIT

CROSS-REFERENCE TO RELATED APPLICATIONS

Relevant subject matter is disclosed in two U.S. patent application Ser. Nos. 12/755,402, filed Apr. 6, 2010 and 12/755,401, filed Apr. 6, 2010, and issued as U.S. Pat. No. 8,097,835 on Jan. 17, 2012, which are assigned to the same assignee as this patent application.

BACKGROUND

1. Technical Field

The present disclosure relates to a temperature control circuit.

2. Description of Related Art

When the temperature is within a range from 0 degrees Celsius to 70 degrees, most electronic devices operate properly. However, when the temperature is too low, such as 10 degrees below zero, some electronic devices cannot work properly. Therefore, an effective temperature control circuit is beneficial for control the working temperature for many electronic devices.

DETAILED DESCRIPTION

Figure 1:
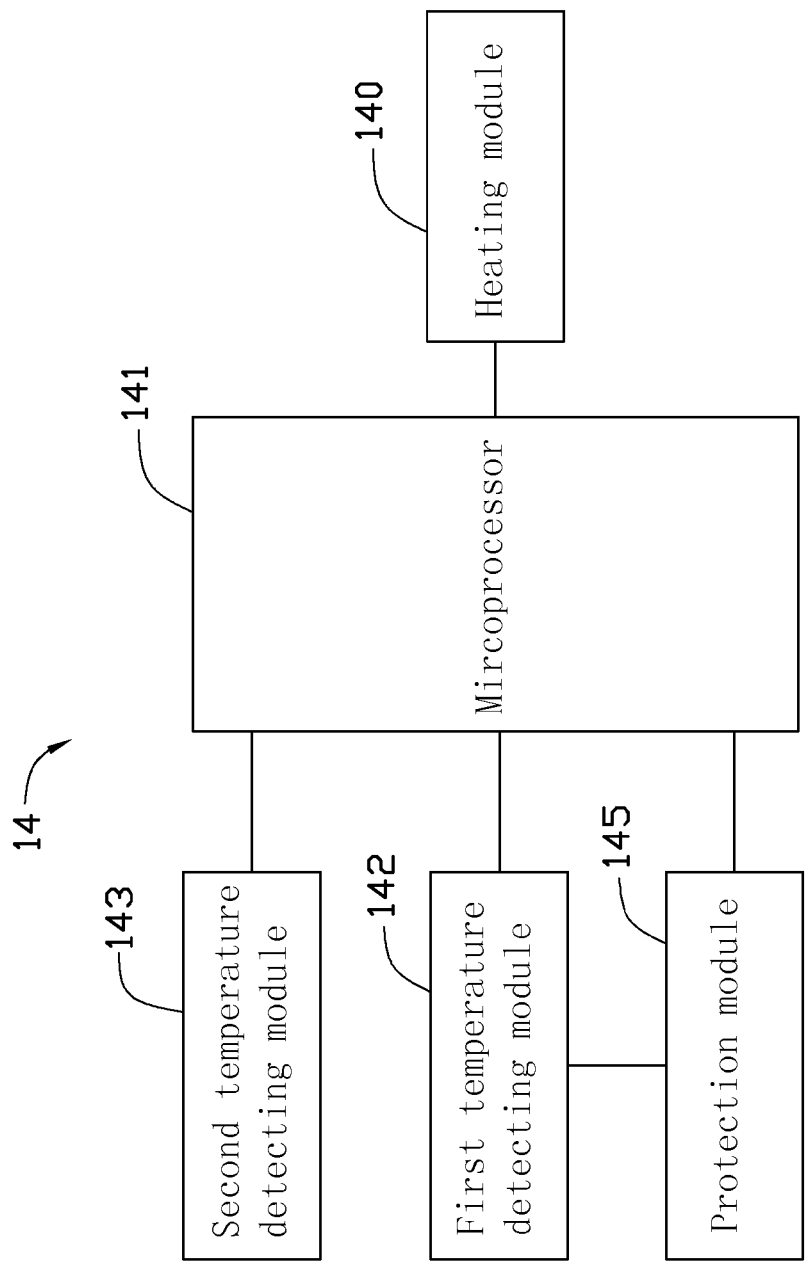
FIG. 1 is a schematic block diagram of an exemplary embodiment of a temperature control circuit.

Referring to FIG. 1, an exemplary embodiment of a temperature control circuit 14 is used in an electronic device to make the electronic device operate properly. The temperature control circuit 14 includes a microprocessor 141, a heating module 140, a first temperature detecting module 142, a second temperature detecting module 143, and a protection module 145. The heating module 140, the first temperature detecting module 142, the second temperature detecting module 143, and the protection module 145 all connect to the microprocessor 141. The protection module 145 also connects to the first temperature detecting module 142. When the electronic device powers on, the heating module 142 starts to heat the electronic device. The first temperature detecting module 142 detects the temperature of the electronic device, and outputs a signal to the protection module 145 for controlling a status of the microprocessor 141. When the microprocessor 141 is in a reset state, the microprocessor 141 does not start the electronic device. When the microprocessor 141 starts to work, the microprocessor 141 starts the electronic device. The second temperature detecting module 143 detects the temperature of the electronic device, and outputs a signal to the microprocessor 141 for controlling the heating module 140 to work or not to work correspondingly.

Figure 2:
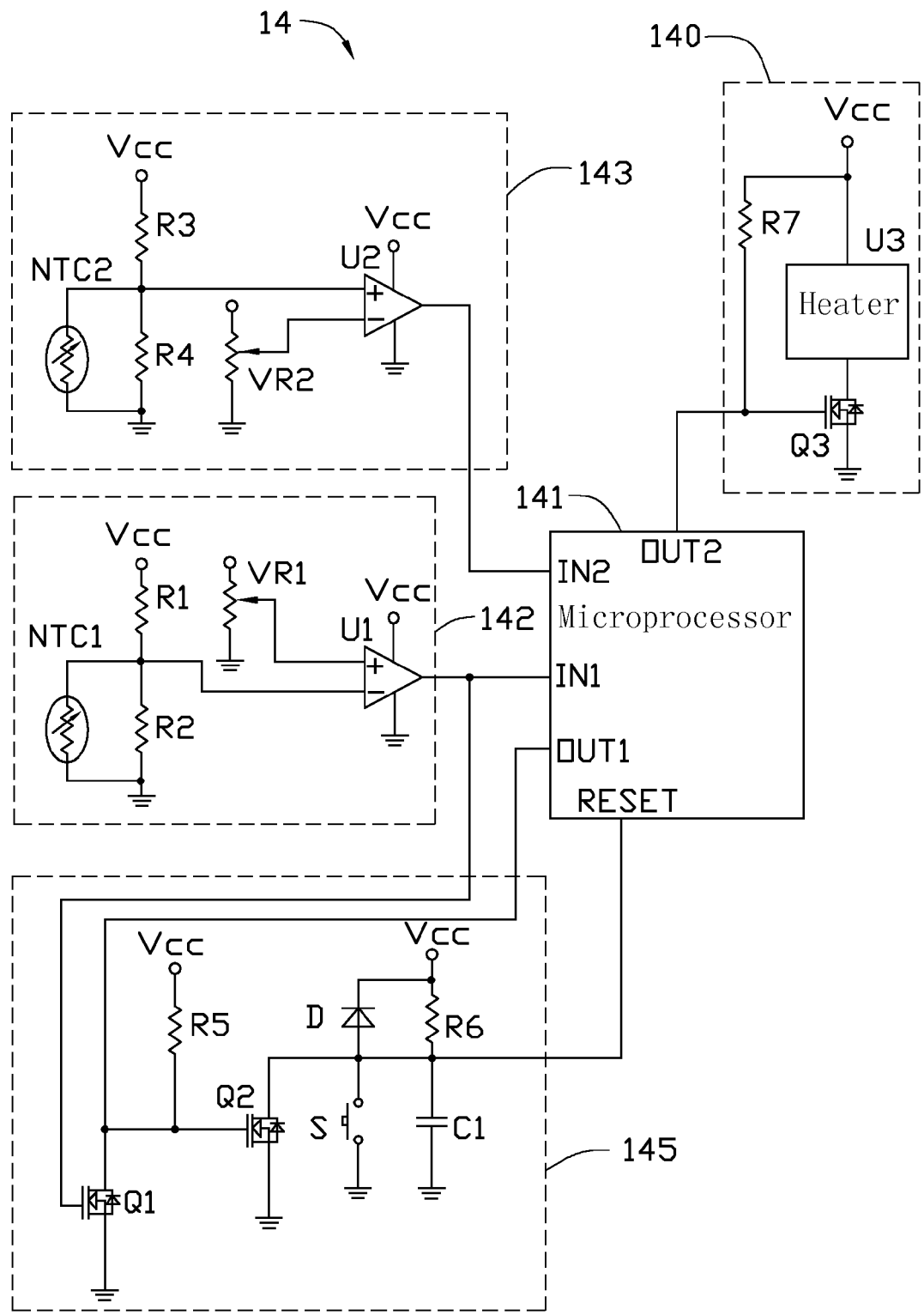
FIG. 2 is a circuit diagram of the temperature control circuit in FIG. 1.

Referring to FIG. 2, the first temperature detecting module 142 includes a thermistor, a comparator U1, and a variable resistor VR1. In this embodiment, the thermistor is a negative temperature coefficient thermistor NTC1. An inverting terminal of the comparator U1 connects to a power source Vcc via a resistor R1. A first terminal of the thermistor NTC1 connects to the inverting terminal of the comparator U1. A second terminal of the thermistor NTC1 goes to ground. A resistor R2 connects to the thermistor NTC1 in parallel. A non-inverting terminal of the comparator U1 connects to a sliding terminal of the variable resistor VR1. A first terminal of the variable resistor VR1 connects to the power source Vcc. A second terminal of the variable resistor VR1 goes to ground. A power terminal of the comparator U1 connects to the power source Vcc. A ground terminal of the comparator U1 goes to ground. An output terminal of the comparator U1 connects to a first input terminal IN1 of the microprocessor 141.

The second temperature detecting module 143 includes a thermistor, a comparator U2, and a variable resistor VR2. In this embodiment, the thermistor is a negative temperature coefficient thermistor NTC2. A non-inverting terminal of the comparator U2 connects to the power source Vcc via a resistor R3. A first terminal of the thermistor NTC2 connects to the non-inverting terminal of the comparator U2. A second terminal of the thermistor NTC2 goes to ground. A resistor R4 connects to the thermistor NTC2 in parallel. An inverting terminal of the comparator U2 connects to a sliding terminal of the variable resistor VR2. A first terminal of the variable resistor VR2 connects to the power source Vcc. A second terminal of the variable resistor VR2 goes to ground. A power terminal of the comparator U2 connects to the power source Vcc. A ground terminal of the comparator U2 goes to ground. An output terminal of the comparator U2 connects to a second input terminal IN2 of the microprocessor 141.

The protection module 145 includes two metallic oxide semiconductor field effect transistors (MOSFETs) Q1 and Q2, a diode D, and a switch S. A base of the MOSFET Q1 connects to the first input terminal IN1 of the microprocessor 141. A drain of the MOSFET Q1 connects to a first output terminal OUT1 of the microprocessor 141 and a base of the MOSFET Q2. The base of the MOSFET Q2 connects to the power source Vcc via a resistor R5. A drain of the MOSFET Q2 connects to a reset terminal RESET of the microprocessor 141, and an anode of the diode D. A cathode of the diode D connects to the power source Vcc. A resistor R6 connects to the diode D in parallel. The anode of the diode D further connects to ground via the switch S. A capacitor C1 connects to the switch S in parallel. Sources of the MOSFETs Q1 and Q2 go to ground.

The heating module 140 includes a MOSFET Q3 and a heater U3. A base of the MOSFET Q3 connects to a second output terminal OUT2 of the microprocessor 141. A drain of the MOSFET Q3 connects to the power source Vcc via the heater U3. A source of the MOSFET Q3 goes to ground. The base of the MOSFET Q3 further connects to the power source Vcc via a resistor R7.

The heater U3 is a positive temperature coefficient heater. The heater U2 and the MOSFET Q3 are contrived to operate properly when the temperature is too low, such as 30 degrees below zero. The diode D is operable to protect the MOSFET Q2.

If the working temperature range of the electronic device is within 0 degrees to 70 degrees within which the electronic device operates properly and when the electronic device powers on in a temperature below zero, the temperature control circuit 14 will operate. At this moment, the second output pin OUT2 of the microprocessor 141 increases to a high voltage level via the power source Vcc and the resistor R7. The MOSFET Q3 turns on. As a result, the heater U3 starts to work to increase the temperature of the electronic device.

Before the temperature of the electronic device reaches 0 degrees, the microprocessor 141 does not work. The electronic device cannot operate properly. At this moment, a resistance of the thermistor NTC1 is large. As a result, a voltage on the thermistor NTC1 is greater than a voltage between the sliding terminal and the second terminal of the variable resistor VR1. In other words, a voltage on the inverting terminal of the comparator U1 is greater than a voltage on the non-inverting terminal of the comparator U1. The comparator U1 outputs a low voltage level. The first input pin IN1 of the microprocessor 141 is at a low voltage level. The gate of the MOSFET Q1 is at a low voltage level. The MOSFET Q1 turns off. The gate of the MOSFET Q2 is at a high voltage level. The MOSFET Q2 turns on. As a result, the reset pin RESET of the microprocessor 141 is at a low voltage level. The microprocessor 141 is in a reset state. In other words, the microprocessor 141 does not start the electronic device. In addition, the second output pin OUT2 of the microprocessor 141 increases to a high voltage level to make the heater U3 heat continuously.

When the temperature of the electronic device reaches a first temperature Tup, such as 20 degrees, the resistance of the first thermistor NTC1 is low. As a result, a voltage on the first thermistor NTC1 is less than a voltage between the sliding terminal and the second terminal of the variable resistor VR1. In other words, a voltage on the inverting terminal of the comparator U1 is less than a voltage on the non-inverting terminal of the comparator U1. The comparator U1 outputs a high voltage level. The first input pin IN1 of the microprocessor 141 is at a high voltage level. The gate of the MOSFET Q1 is at a high voltage level. The MOSFET Q1 turns on. The gate of the MOSFET Q2 is at a low voltage level. The MOSFET Q2 turns off. As a result, the reset pin RESET of the microprocessor 141 is at a high voltage level. The microprocessor 141 starts to work. In other words, the microprocessor 141 starts the electronic device. After the electronic device operates properly, the first output pin OUT1 outputs a low voltage level all the time to make the reset pin RESET of the microprocessor 141 be at a high voltage level. As a result, to reset the microprocessor 141, users must press the switch S.

In addition, a resistance of the thermistor NTC2 is low. As a result, a voltage on the thermistor NTC2 is less than a voltage between the sliding terminal and the second terminal of the variable resistor VR2. In other words, a voltage on the inverting terminal of the comparator U2 is greater than a voltage on the non-inverting terminal of the comparator U2. The comparator U2 outputs a low voltage level. The second input pin IN2 of the microprocessor 141 is at a low voltage level. The first input pin IN1 of the microprocessor 141 is at a high voltage level. As a result, the second output pin OUT2 of the microprocessor 141 is at a low voltage level to make the second output pin OUT2 output a low voltage level. The MOSFET Q3 turns off. As a result, the heater U3 stops working. In the embodiment, the first temperature Tup can be adjusted via adjusting the sliding terminal of the variable resistor VR1.

After the heater U2 stops working, if the temperature of the electronic device is under a second temperature Tdown, such as 10 degrees, the resistance of the thermistor NTC2 is large. As a result, a voltage on the thermistor NTC2 is greater than a voltage between the sliding terminal and the second terminal of the variable resistor VR2. In other words, a voltage on the inverting terminal of the comparator U2 is less than a voltage on the non-inverting terminal of the comparator U2. The comparator U2 outputs a high voltage level. The second input pin IN2 of the microprocessor 141 is at a high voltage level.

In addition, the resistance of the first thermistor NTC1 is large. As a result, a voltage on the first thermistor NTC1 is greater than a voltage between the sliding terminal and the second terminal of the variable resistor VR1. In other words, a voltage on the inverting terminal of the comparator U1 is greater than a voltage on the non-inverting terminal of the comparator U1. The comparator U1 outputs a low voltage level. The first input pin IN1 of the microprocessor 141 is at a high voltage level. As a result, the second output pin OUT2 outputs a high voltage level. The MOSFET Q3 turns on. As a result, the heater U3 starts working again. In the embodiment, the second temperature Tdown can be adjusted via the variable resistor VR2.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A temperature control circuit comprising:
   a microprocessor;
   a protection module connected to the microprocessor;
   a first temperature detecting module connected to the microprocessor and the protection module, and comprising a first thermistor and a first comparator connects to the first thermistor, wherein the first thermistor is operable to sense a temperature to make the first comparator output a first signal to the microprocessor and the protection module, the protection module is operable to control the microprocessor to work or reset according to the first signal;
   a second temperature detecting module connected to the microprocessor, and comprising a second thermistor and a second comparator connected to the second thermistor, wherein the second thermistor is operable to sense a temperature to make the second comparator output a second signal to the microprocessor; and
   a heating module comprising a heater, wherein the microprocessor controls the heater to work or stop working according to the first and second signals, respectively.

2. The temperature control circuit of claim 1, wherein an inverting terminal of the first comparator goes to ground via the first thermistor, and connects to a power source via a first resistor, a non-inverting terminal of the first comparator connects to the power source via a second resistor, an output terminal of the first comparator connects to an input pin of the microprocessor.

3. The temperature control circuit of claim 2, wherein the second resistor is a variable resistor, a first terminal of the variable resistor connects to the power source, a second terminal of the variable resistor goes to ground, and a sliding terminal of the variable resistor connects to the non-inverting terminal of the first comparator.

4. The temperature control circuit of claim 2, wherein the first thermistor connects to a third resistor in parallel.

5. The temperature control circuit of claim 1, wherein a non-inverting terminal of the second comparator goes to ground via the second thermistor, and connects to a power source via a first resistor, an inverting terminal of the second comparator connects to the power source via a second resistor, an output terminal of the second comparator connects to an input pin of the microprocessor.

6. The temperature control circuit of claim 5, wherein the second resistor is a variable resistor, a first terminal of the variable resistor connects to the power source, a second terminal of the variable resistor goes to ground, and a sliding terminal of the variable resistor connects to the inverting terminal of the second comparator.

7. The temperature control circuit of claim 5, wherein the second thermistor connects to a third resistor in parallel.

8. The temperature control circuit of claim 1, wherein the heating module further comprises a switch, the microprocessor controls the switch to turn on or off to make the heater work or not work.

9. The temperature control circuit of claim 8, wherein the switch is a metal-oxide-semiconductor field-effect transistor (MOSFET), a gate of the MOSFET connects to a power source via a first resistor, and connects to an output pin of the microprocessor, a drain of the MOSFET connects to the power source via the heater, a source of the MOSFET goes to ground.

10. The temperature control circuit of claim 1, wherein the protection module comprises a first metal-oxide-semiconductor field-effect transistor (MOSFET) and a second MOSFET, a gate of the first MOSFET connects to an input pin of the microprocessor, a drain of the first MOSFET connects to an output pin of the microprocessor and a gate of the second MOSFET, the gate of the second MOSFET further connects to a power source via a first resistor, a drain of the second MOSFET connects to a reset pin of the microprocessor, sources of the first and second MOSFETs go to ground.

11. The temperature control circuit of claim 10, wherein the protection module further comprises a diode and a second resistor, an anode of the diode connects to the reset pin of the microprocessor, a cathode of the diode connects to the power source, the second resistor connects to the diode in parallel.

12. The temperature control circuit of claim 10, wherein the protection module further comprises a switch and a capacitor, a first terminal of the switch connects to the reset pin of the microprocessor, a second terminal of the switch goes to ground, the capacitor connects to the switch in parallel.

13. A temperature control circuit comprising:
a microprocessor comprising a first input pin, a second input pin, a first output pin, a second output pin, and a reset pin;
a protection module connected to the first output pin and the reset pin of the microprocessor;
a heating module connects to the second output pin of the microprocessor;
a first temperature detecting module connects to the protection module and the first input pin of the microprocessor, to detect a temperature and output a first signal to the microprocessor and the protection module; and
a second temperature detecting module connects to the second input pin of the microprocessor, to detect the temperature and outputs a second signal to the microprocessor, wherein the protection module outputs a third signal to the microprocessor to make the microprocessor be in a reset state according to the first signal of the first temperature detecting module, and the microprocessor outputs a fourth signal according to the first and second signals to control the heating module to work before the temperature reaches a first temperature; wherein the protection module outputs a fifth signal to control the microprocessor to work according to the first signal of the first temperature detecting circuit, and the microprocessor outputs a sixth signal to control the heating module not to work according to the first and second signals when the temperature reaches the first temperature; and wherein the microprocessor outputs a seventh signal to control the heating module to work according to the first and second signals when the temperature is under a second temperature.

14. The temperature control circuit of claim 13, wherein the first temperature detecting module comprises a thermistor and a comparator, an inverting terminal of the comparator goes to ground via the thermistor, and connects to a power source via a first resistor, a non-inverting terminal of the comparator connects to the power source via a second resistor, an output terminal of the comparator connects to the first input pin of the microprocessor.

15. The temperature control circuit of claim 14, wherein the second resistor is a variable resistor, a first terminal of the variable resistor connects to the power source, a second terminal of the variable resistor goes to ground, a sliding terminal of the variable resistor connects to the non-inverting terminal of the first comparator.

16. The temperature control circuit of claim 14, wherein the thermistor connects to a third resistor in parallel.

17. The temperature control circuit of claim 13, wherein the second temperature detecting module comprises a thermistor and a comparator, a non-inverting terminal of the comparator goes to ground via the thermistor, and connects to a power source via a first resistor, an inverting terminal of the comparator connects to the power source via a second resistor, an output terminal of the comparator connects to the second input pin of the microprocessor.

18. The temperature control circuit of claim 17, wherein the second resistor is a variable resistor, a first terminal of the variable resistor connects to the power source, a second terminal of the variable resistor goes to ground, a sliding terminal of the variable resistor connects to the inverting terminal of the first comparator.

19. The temperature control circuit of claim 13, wherein the heating module comprises a heater and a metal-oxide-semiconductor field-effect transistor (MOSFET), a gate of the MOSFET connects to a power source via a first resistor, and connects to the first output pin of the microprocessor, a drain of the MOSFET connects to the power source via the heater, a source of the MOSFET goes to ground.

20. The temperature control circuit of claim 13, wherein the protection module comprises a first metal-oxide-semiconductor field-effect transistor (MOSFET) and a second MOSFET, a gate of the first MOSFET connects to the first input pin of the microprocessor, a drain of the first MOSFET connects to the first output pin of the microprocessor and a gate of the second MOSFET, the gate of the second MOSFET further connects to a power source via a first resistor, a drain of the second MOSFET connects to the reset pin of the microprocessor, sources of the first and second MOSFETs go to ground.

* * * * *